United States Patent [19]
Guerrieri

[11] 3,987,147
[45] Oct. 19, 1976

[54] PROCESS TO DESULFURIZE GAS AND RECOVER SULFUR

[75] Inventor: Salvatore A. Guerrieri, Newark, Del.

[73] Assignee: The University of Delaware, Newark, Del.

[22] Filed: Feb. 21, 1974

[21] Appl. No.: 444,516

[52] U.S. Cl. ............................... 423/242; 423/422; 423/428
[51] Int. Cl.² ................................................ C01B 17/00
[58] Field of Search .......................... 423/242–244, 423/428, 422

[56] References Cited
UNITED STATES PATENTS

| | | | |
|---|---|---|---|
| 1,918,513 | 7/1933 | Wagner | 423/422 |
| 3,401,010 | 9/1968 | Guerrieri | 423/428 |
| 3,402,992 | 9/1968 | Ahlborg | 423/422 |
| 3,438,727 | 4/1969 | Heredy | 423/242 |
| 3,574,545 | 4/1971 | Granthan | 423/242 |

*Primary Examiner*—Oscar R. Vertiz
*Assistant Examiner*—Gregory A. Heller

[57] ABSTRACT

A continuous cyclic process for removing sulfur dioxide from gases produced in the combustion of fossil fuels or in chemical and metallurgical operations by means of an aqueous solution including the carbonate of an alkali metal to absorb said oxide out of said gases whereby the metal carbonate is converted into the metal sulfite. A two step recovery process is employed to reproduce the aqueous carbonate solution for reuse in the absorption step and to produce hydrogen sulfide which may be converted into elemental sulfur by well known means, if desired.

9 Claims, 1 Drawing Figure

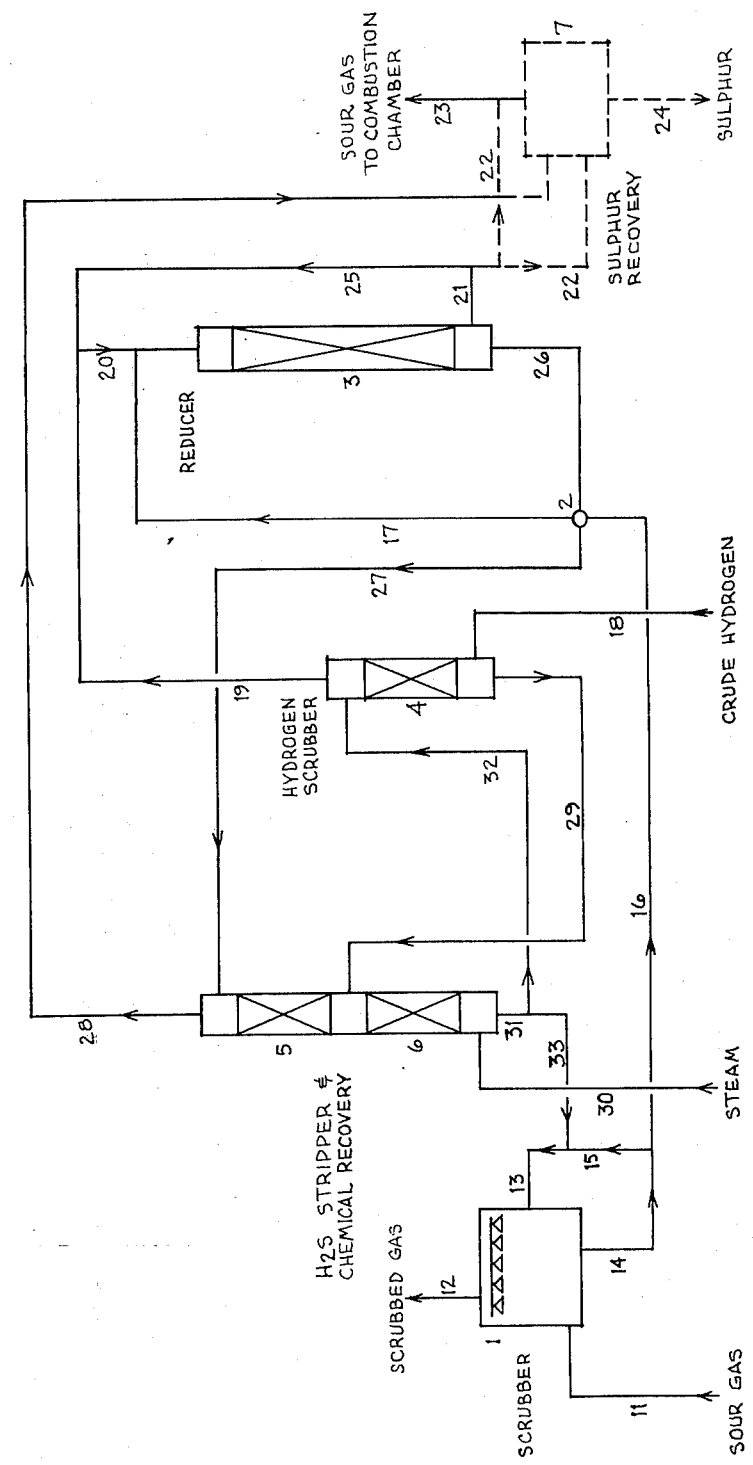

PROCESS TO DESULFURIZE GAS AND RECOVER SULFUR

BACKGROUND

1. Field of the Invention

This invention relates to the elimination of air pollution due to sulfur dioxide in industrial sour gases emitted into the atmosphere. The process is a continuous cyclic one, employing aqueous solutions in both the sour gas scrubbing and in the chemicals recovery steps. Sulfur dioxide is scrubbed out of sour gases by means of a reactive aqueous solution; sulfur is then recovered from the solution as hydrogen sulfide in a process which also receives the reactive solutions.

2. Brief Description of the Prior Art

Numerous processes have been proposed or are in various stages of development or use to abate sulfur dioxide pollution of the atmosphere. These may be classified generally as employing a wet or a dry process.

Wet processes have received most of the attention, partly because at least a part of the technology needed was already available. These include throw-away processes which scrub the gases with a lime, limestone, or dolomite slurry and discard the spent slurry. A variation of this throw-away process is to scrub the gases with an alkali metal absorbent solution, and to regenerate the alkali by reaction with lime. The spent lime is discarded.

Other wet process employ sodium or ammonium-based absorbent solutions. The ammonium-based solutions are not readily recoverable. One sodium-based plant, in limited commercial operation, delivers sulfur dioxide which can be reduced to elemental sulfur if desired. Others are in various stages of development and will produce sulfuric acid or elemental sulfur.

Some novel processes still in early stages of development include a formate process using a potassium salt, a citrate process, and a process using an undisclosed organic solvent, to cite a few examples.

Dry processes are generally in early development stages and include the use of activated carbon, or molten salts as the active sulfur dioxide removal agent.

At one time the use of potassium sulfite operated in a sulfite/bisulfite cyclic process was advocated because, with the potassium salt, which has a higher solubility than the sodium salt, less water would have had to be evaporated in the recovery step and thus recovery cost would have been lower. In the development of the process, however, two unforeseen but important difficulties were encountered. In the absorber, potassium metabisulfite was formed in addition to potassium bisulfite when sulfur dioxide in the gas reacted with potassium sulfite in the solution. The metabisulfite, which is the least soluble of the three compounds, crystallized out of solution and plugged the tower. In addition to this problem, a much larger amount of potassium sulfate than predicted was produced in the recovery step. A market for this product was dubious and the cost of replacing potassium lost as a sulfate was too high for the process, hence the use of potassium sulfite as an absorption medium in this type of process was abandoned.

All of the processes in use or being developed have their advantages and disadvantages. None of them stands out as the probable candidate for wide spread, long-term applications, but the need for such process is clear.

3. Objectives of this Invention

One objective of this invention is to provide a cyclic wet scrubbing process for the removal of oxides of sulfur from gases. Another object is to provide a cyclic process employing a reactive aqueous absorption solution which effectively removes oxides of sulfur from gases, regenerates the aqueous absorption solution for reuse in the gas cleaning stage, and produces a sulfur compound readily convertible into elemental sulfur.

These and other objectives will become apparent in the following description of the invention taken with reference to the drawings.

SUMMARY OF THE INVENTION

This invention comprises a continuous cyclic process for removing sulfur dioxide from gases by absorption in an aqueous absorption solution, recovering sulfur as hydrogen sulfide and reproducing the aqueous absorption solution.

Sulfur dioxide included in a sour gas mixture is dissolved out of the gas in a scrubber by means of an aqueous solution including an excess of alkali metal carbonate to derive an aqueous solution which incudes both the alkali metal carbonate and the sulfite and a gas which is at least partially purified of sulfur dioxide. The overall reaction is represented by the simplified equation $$M_2CO_3 + SO_2 = M_2SO_3 + CO_2 \qquad (1)$$

A portion of said derived solution withdrawn from said scrubber is returned to the scrubber and the rest is transferred to the recovery step, where it is introduced into a reducing zone (reducer). The sulfur bearing compounds in the solution introduced into the reducer are converted into the sulfide by reaction with an excess of reducing gas such as hydrogen at an elevated temperature and pressure according to the equation $$M_2SO_3 + 3H_2 = M_2S + 3H_2O \qquad (2)$$

The resultant aqueous solution, including the derived metal sulfide, is transferred from said reducer into a hydrogen sulfide stripping zone (hydrogen sulfide stripper) and contacted with a gas including an excess of carbon dioxide to convert the metal sulfide in the aqueous solution into the bicarbonate, and to liberate hydrogen sulfide in accordance with the reaction $$M_2S + 2CO_2 + 2H_2O = 2MHCO_3 + H_2S \qquad (3)$$

The aqueous solution, including the metal bicarbonate, is transferred into a decomposing zone (chemical recovery zone) while hydrogen sulfide is tranferred to a user or to an elemental sulfur producer.

Hydrogen is obtained by contacting crude hydrogen, including carbon dioxide, with an aqueous solution including an alkai metal carbonate whereby the carbon dioxide is absorbed by said solution to derive a solution including a metal bicarbonate. Said solution is transferred to a decomposing zone where it joins the aqueous bicarbonate solution from the hydrogen sulfide stripper. In the decomposing zone, the combined aqueous metal bicarbonate solution is heated to derive an aqueous carbonate solution and carbon dioxide. The liberated carbon dioxide is returned to said hydrogen sulfide stripping zone. A portion of said derived carbonate solution is transferred to the sour gas scrubber to repeat the absorption of sulfur dioxide from the sour gas; the remaining portion is transferred to the crude hydrogen gas scrubber.

Of the alkali metal salts that may be used potassium and sodium salts are preferred. Other salts which may be introduced as catalysts for the reduction process are referred to generically as reduction catalysts, preferably the salt of a metal selected from the group which includes cobalt, copper, iron, manganese, tin, and zinc.

DESCRIPTION OF THE DRAWING

The invention will now be further described in respect to the preferred embodiments with reference to the accompanying drawing which is a flow plan presenting the process elements of the sulfur dioxide removal and sulfur recovery system.

Sour gas scrubber 1 is supplied with a strong aqueous solution of potassium salts including potassium carbonate. Said solution enters the scrubber through line 13 and leaves through line 14. Sour gas enters scrubber 1 through line 11 and scrubbed gas leaves the scrubber through line 12. The aqueous solution from said scrubber, including potassium sulfite as well as potassium carbonate, leaves the scrubber in line 14 and is divided into two portions. One portion, in line 15, is returned to the scrubber through line 13, the other portion, to which a reduction catalyst may be added, is introduced into the recovery section through line 16, passing first through recuperator 2 and then through line 17, into reducer 3, where potassium sulfite is reduced to potassium sulfide as illustrated by equation (2). As written, this eequation does not indicate the extensive hydrolysis of $K_2S$ which actually occurs but a precise definition of the chemistry is not essential for an understanding of the process.

The reducing zone is designed to provide intimate and extensive contact of the liquid and gas phases to minimize the contact time needed to reduce the metal sulfite in the solution from said sour gas scrubber 1.

In accordance with modern practice, hydrogen is derived from fossil fuels and therefore crude hydrogen invariably includes carbon dioxide. To remove the carbon dioxide the hydrogen is introduced as a crude stream through line 18 into hydrogen scrubber 4 where it is purified by contact with an aqueous solution containing potassium carbonate. The purified hydrogen gas leaves said scrubber through line 19 and enters reducer 3 through line 20 together with recyle hydrogen. Within reducer 3 contact between solution and gas takes place in the presence of a large excess of hydrogen in order to facilitate substantially complete reduction of the sulfur compounds to the metal sulfide in an economically minimum amount of time. As previously stated the reducer is operated at an elevated pressure and temperature. Unreacted hydrogen leaves said reducer through line 21 and is divided into two streams. A relatively small purge stream including the excess hydrogen is diverted into line 22 and is conveyed either into a sulfur recovery unit 7 or to the combustion chamber of a furnace (not shown) through line 23, the disposal method depending upon the composition of said purge stream. Obviously, if it contains no contaminants, said gas may be vented directly into the atmosphere.

A second portion of the unreacted hydrogen in line 21 is diverted into line 25 and combined in line 20 with fresh hydrogen from line 19 and then introduced into said reducer. The solution leaving the reducer through line 26 is passed through recuperator 2 for heat recovery and is then introduced into $H_2S$ stripper 5 through line 27.

In $H_2S$ stripper 5, the aqueous solution of potassium sulfide is contacted counter currently with a gas stream rich in carbon dioxide whereby the sulfide is converted into the bicarbonate as shown by equation 3. The liberated hydrogen sulfide together with excess carbon dioxide is withdrawn from said stripper through line 28 and transferred to a sulfur recovery unit 7, if it is desired to produce elemental sulfur. Residue gas from the sulfur recovery unit is taken to the combusion chamber of a furnace through line 23, elemental sulfur is withdrawn and sent to storage through line 24. Obviously said hydrogen sulfide in the gas in line 28 could be used directly for the manufacture of other products, such as sulfuric acid. The final disposition of hydrogen sulfide is not a part of the invention but is mentioned here only to illustrate possible non polluting disposal methods because the total system must include suitable procedures for using or storing the sulfur removed from the sour gas.

The aqueous solution of potassium bicarbonate leaving the hydrogen sulfide stripper 5 enters the decomposing zone 6 (chemicals recovery zone) where it is combined with the aqueous bicarbonate solution produced in crude hydrogen scrubber 4 and is introduced from said scrubber through line 29. This zone (6) is shown combined into a single tower with hydrogen sulfide stripping zone 5. Conversion of the bicarbonate to the carbonate is effected by heating the solution to the boiling point at which temperature the conversion proceeds as indicated by the equation $$2KHCO_3 = K_2CO_3 + H_2O + CO_2 \qquad (4)$$

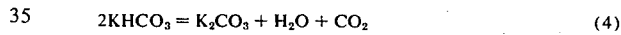

Introducing low pressure steam through line 30 is a convenient way to supply the necessary heat. A gas stream rich in carbon dioxide, which is produced in the said reaction is conveyed into the bottom of hydrogen stripper 5 as previously described.

The potassium carbonate solution produced in said decomposing zone is withdrawn from zone 6 through line 31 and divided into two streams. One stream is conveyed in line 32 to crude hydrogen scrubber 4 to purity the crude hydrogen, as previously described, the other stream is returned to the sour gas scrubber through lines 33 and 13 to repeat the absorption and recovery cycle.

EXAMPLE OF THE INVENTION

The example of the invention which follows is based upon a power plant sulfur dioxide removal system which treats 1.5 million pounds of flue gas per hour (312,000 SCFM, 0°C., 760 mm Hg) containing 0.19 volume percent or about 95 pound moles per hour of sulfur dioxide. Although only about 87 percent of the incoming sulfur dioxide needs to be removed to meet EPA standards, 100 percent removal is used in the material balances which follow. (All moles below are pound moles.)

The potassium carbonate/sulfite solution from sour gas scrubber 1 is fed to the recovery unit through line 16 at a rate of 50,900 pounds per hour and contains 3500 pounds of $K_2CO_3$, 15,000 pounds of $K_2SO_3$, and 32,400 pounds of water. A ferrous sulfide reduction catalyst is introduced as a slurry into said solution at a rate of about 4.5 pound moles per hour.

The mixture is passed through recuperator 2 to recover heat in the solution from reducer 3 and to approach the reaction temperature in said reducer.

Reduction is performed by contacting said solution with a gas stream containing hydrogen at a pressure of about 3,000 pounds per square inch gauge and at a temperature of about 570 degrees Fahrenheit. Hydrogen, comprising a mixture of fresh and recycle gas is introduced into said reducer at a rate of 5,700 pound moles per hour. For complete reduction of the sulfur compounds in the solution fed to the reducer 285 moles of hydrogen are required. The large excess actually used provides an almost constant hydrogen partial pressure, intimate mixing of the two phases and short reaction time.

Although the indicated temperature and pressure are satisfactory for the reduction process of this example other temperatures and pressures may be preferred in some cases. The final equilibrium of the reaction is affected by temperature and pressure which affect both hydrogen solubility and absolute reaction rates. Temperature also affects hydrogen partial pressure (for any given total pressure) because of the effect of vapor pressure of water. Optimization requires proper allowance for all of these variables and other pertinent ones.

The potassium sulfide produce from reducer 3 is transferred into hydrogen sulfide stripper 5 through line 26, recuperator 2 and line 27. In this reactor the aqueous solution of potassium sulfide is contacted by a counterflowing gas stream rich in carbon dioxide to derive an aqueous solution including potassium bicarbonate and a gas stream including hydrogen sulfide.

Carbon dioxide from the chemicals recovery tower 6 enters said hydrogen sulfide stripper 5 at a rate of 260 moles per hour, including about 45 moles per hour which are in excess of the theoretically required amount.

Pressure in the hydrogen sulfide stripper is about atmospheric, temperature is below 60°C. The gaseous stream, including as hydrogen sulfide all of the sulfur removed from the sour gas and the excess carbon dioxide used in said stripper, which amount to about 95 moles and 45 moles per hour, respectively, is withdrawn from hydrogen stripper 5 through line 28 and transferred to sulfur recovery unit 7 or to other disposal means.

The aqueous solution withdrawn from said hydrogen sulfide stripper includes about 260 moles per hour of potassium bicarbonate. It is introduced into the chemicals recovery tower where, by heating the solution to its boiling point, the potassium bicarbonate is converted into 130 moles per hour of potassium carbonate; concurrently 130 moles of carbon dioxide per hour are liberated and recycled into the hydrogen sulfide stripper.

In addition, the aqueous solution of potassium bicarbonate, withdrawn from the crude hydrogen scrubber 4 and amounting to 260 moles of potassium bicarbonate per hour, is introduced into recovery zone 6. Conversion of the bicarbonate in this stream into the carbonate, produces an additional 130 moles of carbon dioxide and an additional 130 moles of potassium carbonate. Thus the total carbon dioxide entering the hydrogen sulfide stripper amounts to 260 moles per hour of which about 215 moles are consumed in converting the sulfide to the bicarbonate and the excess carbonate into the bicarbonate. The 45 moles per hour of excess carbon dioxide are discharged from the hydrogen sulfide stripper together with the hydrogen sulfide produced therein.

The total potassium carbonate solution withdrawn from recovery tower 6 is divided into two streams. One stream is returned to sour gas scrubber 1, the other is transferred to crude hydrogen scrubber 4 to repeat their respective cycles.

The use of the potassium salt is preferred because it is more soluble than the sodium salt. Its use requires less water and therefore saves process heat and electric power. This economic advantage is partially balanced by the higher cost of potassium salts over sodium salts, but except for the initial charge, which represents a small fraction of the capital investment, the make up cost difference is insignificant because chemical losses should be nil, barring mechanical difficulties such as leaks in the process equipment.

The process of this invention avoids the formation of salts of low solubility in the sour gas scrubber and of potassium sulfate in the recovery section, both of which occurrences were severe handicaps in earlier attempts to use potassium salts. In fact the recovery process of this invention is capable of recovering potassium carbonate from the sulfate.

Furthermore, the use of potassium carbonate in the absorption stage instead of potassium sulfite, as was used in earlier processes, makes possible quantitative removal of sulfur dioxide, if desired, because the partial pressure of sulfur dioxide over a carbonate solution is nil unlike a sulfite/bisulfite solution where there is a positive, through small, sulfur dioxide partial pressure over the solution. Thus in the latter case complete removal of sulfur dioxide is theoretically as well as practically impossible, because the solution at the top of the scrubber contains at least some bisulfite compound.

Equation 1 shows that each mole of sulfur dioxide scrubbed out of the sour gas releases one mole of carbon dioxide from the absorption solution, and therefore one mole of carbon dioxide per mole of sulfur dioxide must be supplied to the process. As previously described, one source for this carbon dioxide is the crude hydrogen stream.

Another source for the needed carbon dioxide is the purified sour gas after removal of sulfur dioxide in scrubber 1. This procedure is not economically attractive because the combustion products comprising the scrubbed sour gas are leaner in carbon dioxide than the raw hydrogen mixture and furthermore are available only at a low pressure whereas crude hydrogen can be made available at higher pressure. Therefore the recovery of carbon dioxide from combustion products would be more expensive than from the crude hydrogen streams.

Hydrogen is the preferred reducing gas because no gaseous reaction products are formed in the reducer. Thus hydrogen partial pressure can be maintained at a high level and hydrogen loss in the purge stream from the reducer is minimized.

Obviously the process description presented in the specifications does not refer to standard equipment components such as heat exchanges, pumps, compressors, controllers and the like which one skilled in the art would incorporate into an operable plant.

Preferred embodiments and alternatives of the invention have been described and explained. It is understood that these are merely illustrative and that changes may be made without departing from the scope or the broader aspects of the invention as claimed.

I claim:

1. A continuous cyclic process for removing sulfur dioxide from a sour gas mixture by:
   a. contacting said sour gas mixture with an aqueous solution which includes an excess of an alkali metal carbonate whereby sulfur dioxide is transferred from said sour gas into said aqueous solution converting at least a portion of the metal carbonate in said solution into the sulfite, and discharging into the atmosphere a scrubbed gas including a reduced quantity of sulfur dioxide,
   b. purifying a second gas stream including hydrogen and carbon dioxide by contact with an aqueous solution including an alkali metal carbonate whereby carbon dioxide in said gas stream is absorbed by said solution and the carbonate therein is converted into the bicarbonate, and conveying the derived aqueous solution into the decomposing zone of step (f),
   c. withdrawing the aqueous solution produced in step (a), returning a portion of said solution to step (a), transferring the remaining portion into a reducing zone where said aqueous solution is reacted with an excess of the purified hydrogen containing gas stream from step (b) at an elevated pressure and temperature whereby at least a portion of the hydrogen in said reducing gas reacts with the metal sulfite in said aqueous solution, and reduces the metal sulfite in said solution to the metal sulfide,
   d. withdrawing a portion of the unreacted gas including said hydrogen from said reducing zone of step (c), returning said portion to step (c), withdrawing and discharging, the remaining portion of said gas including the excess hydrogen introduced into said reducing zone in step (c),
   e. transferring the aqueous solution derived in step (c) to a stripping zone where the metal sulfide in said solution is converted into the metal bicarbonate and hydrogen sulfide is liberated by reaction with a gas including an excess of carbon dioxide to produce a gas mixture including hydrogen sulfide,
   f. supplying the carbon dioxide required for step (e) by transferring said aqueous alkali metal bicarbonate solution from step (e) into a decomposing zone and combining it with the aqueous solution from step (b) wherein the metal bicarbonate in said solution is converted at an elevated temperature into the metal carbonate and carbon dioxide is liberated,
   g. conveying said carbon dioxide liberated in step (f) into the stripping zone of step (e)
   h. conveying a portion of said aqueous carbonate solution from step (f) to step (a) and conveying a second portion of said solution to step (b).

2. The process of claim 1, wherein said sour gas and said aqueous solution of step (a) flow in generally counter current mode.

3. The process of claim 1, wherein the gas and liquid streams in step (b) flow in generally counter current mode at a pressure between 1000 pounds per square inch and 5000 pounds per square inch and at a temperature between 150° centigrade and 300° centigrade.

4. The process of claim 1, wherein the aqueous solution in step (b) includes a reduction catalyst selected from the group consisting of the salts of cobalt, copper, iron, manganese, tin and zinc, the amount being between one half and five mol percent of the total solids in said aqueous solution.

5. The process of claim 1, wherein the alkali metal is either sodium or potassium.

6. The process of claim 1, wherein
   a. the pressure in said hydrogen sulfide stripping zone in step (e) is about atmospheric and the temperature is below 60°C, and
   b. the pressure in said decomposing zone in step (f) is about atmospheric and the temperature is at least 60°C.

7. The process of claim 1, wherein the said second gas stream in step (b) is purified at a pressure between 5 psig and 200 psig and at a temperature between 20°C and 100°C.

8. The process of claim 1, wherein the concentration of said alkali metal compounds in said aqueous solutions are below the saturation concentrations at the prevailing temperature and pressure and the quantity of metal carbonate in solution in the sour gas scrubber in step (a) is in excess of the quantity required by the overall reaction

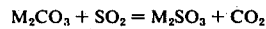

$$M_2CO_3 + SO_2 = M_2SO_3 + CO_2$$

wherein M denotes the alkali metal.

9. The process of claim 1, wherein at least a portion of the carbon dioxide required in the stripping zone of step (e) is derived either from the purified sour gas of step (a) or from the hydrogen scrubber of step (b).

* * * * *